Figure 1:
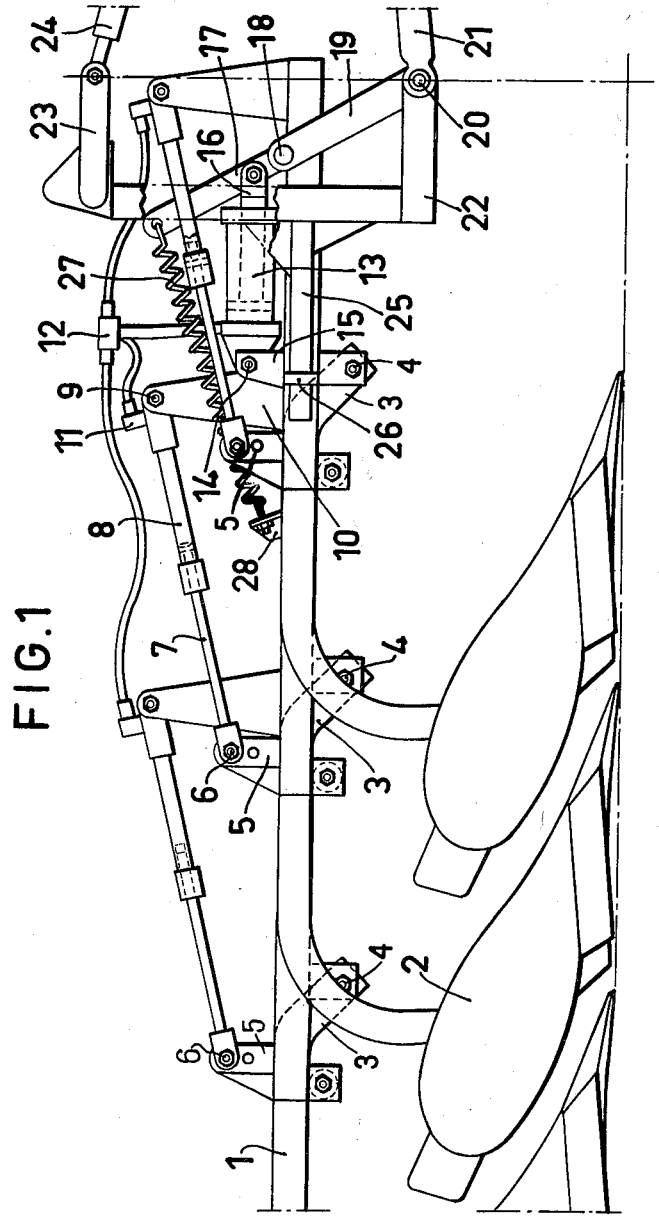

March 9, 1965 J. M. TROLLSÅS 3,172,481
PLOWS WITH UPWARDLY FOLDING PLOW BODIES
Filed Feb. 6, 1962 2 Sheets-Sheet 1

INVENTOR
JOHN MAGNUS TROLLSÅS
BY Darby & Darby
ATTORNEYS

March 9, 1965     J. M. TROLLSÅS     3,172,481
PLOWS WITH UPWARDLY FOLDING PLOW BODIES
Filed Feb. 6, 1962     2 Sheets-Sheet 2

INVENTOR
JOHN MAGNUS TROLLSÅS
BY Darby & Darby
ATTORNEYS

United States Patent Office 3,172,481
Patented Mar. 9, 1965

3,172,481
PLOWS WITH UPWARDLY FOLDING
PLOW BODIES
John Magnus Trollsås, Overum, Sweden, assignor to
Aktiebolaget Overums Bruk, Overum, Sweden, a
joint-stock company of Sweden
Filed Feb. 6, 1962, Ser. No. 171,406
Claims priority, application Sweden, Feb. 17, 1961,
1,692/61
2 Claims. (Cl. 172—261)

This invention relates to plows comprising a plurality of plow bodies, particularly of the type connected to a tractor by means of two lower pull rods and an upper pressure rod (or a pair of pressure rods). Plows of the said type are already well-known. In Swedish patent specification 161,298 (issued to A. B. Overums Bruk on November 12, 1957), for example, a plow construction is described which comprises two plow bodies each secured to a corresponding plow beam pivoted in the plow frame, and adapted to be folded upwards individually.

The arrangement according to Swedish patent specification 161,298 has proved in practice to be a two-furrow plow with excellent operating properties, which is particularly due to the fact that, when a plow body strikes against a stone or like obstacle in the ground and folds upwards to prevent overloading, part of this displacing motion of the plow body is transferred by linkage to the supporting means of the tractor, in such a manner, that the moment which seeks to force the plow frame downwards is increased, while at the same time the plow frame is forced forwards in relation to the pulling tractor.

By this latter movement, the plow body which is not yet folded upwards stays free of any tendency to participate in the displacing motion of the plow body folded upwards. Known plow constructions of conventional type usually suffer from the disadvantage of showing such a tendency, which not only results in reduced furrow depth but even necessitates a rearward movement of the tractor for restoring satisfactory operating order of the entire system. The aforesaid movement of the plow frame contributes, moreover, substantially to the automatic return of the upwardly folded plow body into operating position.

There is no difficulty in solving the problem for plows comprising two plow bodies in the manner described in the aforementioned Swedish patent specification which, it is true, also includes the information that the same method can be applied to plows with more than two plow bodies. It is proved by experience, however, that a unit which comprises 3 ,4 or 5 coupled plow bodies renders necessary a relatively complicated construction including a plurality of co-operating lever bridges, which makes the construction expensive, clumsy and heavy.

According to the invention, the problem is solved by balancing a plow comprising three or more plow bodies such, that each plow body can be folded upwards individually, and that the moment imparted to the plow frame is of the same favorable counteractive effect as in the case of two plow bodies according to the aforementioned Swedish patent specification. The device according to the invention is substantially characterized in that each plow body and associated fastening means (plow beam) actuates a corresponding ram in a hydraulic circuit, the ram actuating a linkage such that, when any of the plow bodies is being folded upwards, the plow frame is displaced forwards in relation to the tractor by the said linkage.

In a particularly preferred embodiment, each pull rod from the tractor on both sides of the device is articulated with the free end of an arm, the arms being rigidly connected with a transverse shaft mounted in bearings on the plow frame and carrying at its center a shifting arm which cooperates with a hydraulic main cylinder secured on the plow frame.

The supporting arms of the pull rods may further be provided with a pivoted bridge which is articulated at its upper end with the pressure rod from the tractor, the central portion of the bridge being displaceable in a guide bar on the plow frame. In this embodiment, the main cylinder is preferably arranged such, that it co-operates with a ram provided for each plow body.

Figure 2:
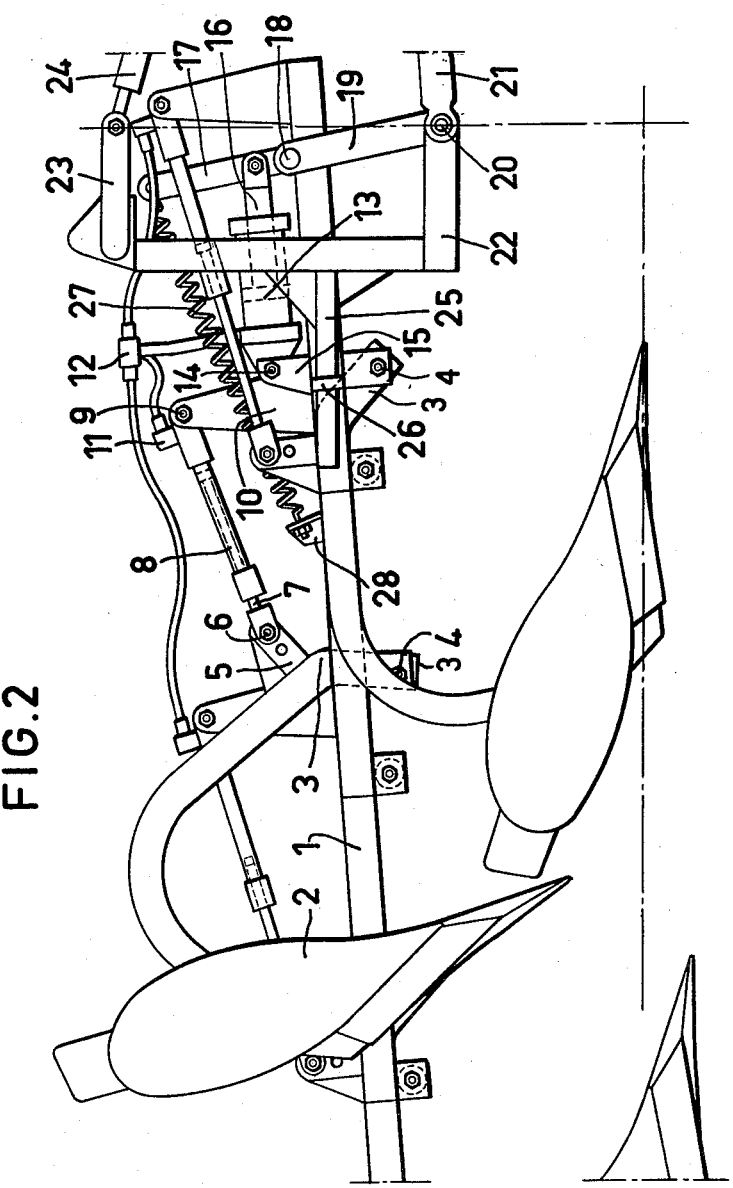

The accompanying drawing illustrates an embodiment of the invention, whereof—
FIG. 1 shows the device with the plow bodies in operating position, and
FIG. 2 shows the conditions when a plow body is being folded upwards.

As the said conditions are identical for all plow bodies, the description refers to the plow body in upwardly folded position as shown in the figure.

Referring to the figure, each plow body 2 with a corresponding plow beam 3 is pivoted about a shaft 4 in a plow frame 1, and for each plow, a support 5 rigidly secured on plow beam 3 is at its upper end articulated by a journal 6 with a piston 7 in a hydraulic ram 8, which is pivoted by a journal 9 on a support 10 rigidly secured on plow frame 1. The ram fluid communicates via a union 11 with a hydraulic system serving all plow bodies. All of the rams 8 are connected via a manifold 12 with a common main cylinder 13.

The main cylinder 13 is pivoted at one end by a journal 14 on a support 15 rigidly secured on plow frame 1, the other cylinder end being articulated via a displaceable piston and projecting piston rod 16 with a shifting lever or center arm 17 which is secured at the center of a transverse shaft 18 arranged to rotate in plow frame 1. Each of two arms 19 fastened at the end portions of the shaft 18 carries at its lower free end a journal 20 for connection with the pull rods 21 from the tractor. A relatively stable bridge 22 supported on the journals 20 serves with its upper portion as a bracket for an adjustable link 23 (adjustment means not shown) which is articulated with the pressure rod 24 from the tractor. Between the fastening points for the tractor, the bridge is provided on both sides with a guide 25 displaceably supported in a loop or eye 26 rigidly secured on each side of the plow frame, in such a manner, that vertical force components from the bridge, such as lift forces, can be transferred by said connection to the plow frame, or vice versa.

When in operation, the device according to the invention requires no special plow spring. There is, however, a spring 27 provided between the shifting arm 17 and a spring bracket 28 secured to plow frame 1, in order to render easier transport of the equipment by lifting the same with the help of the hydraulic lifting means of the tractor, so that after the disconnection of the pulling force the plow bodies can maintain their respective operating positions. The spring contributes, moreover, during operating conditions to the return movement of an upwardly folded plow body, and also affords part of the force retaining the plow bodies in normal operating position.

When a plow body is being folded up for avoiding an obstacle in the ground, the direct resistance by the soil is, of course, reduced, but at the same time the plow body in question presses the piston into its ram cylinder, thus increasing the pressure in the hydraulic system. By this higher liquid pressure, the shifting lever 17 and aforesaid transverse shaft 18 are forced via the piston rod 16 of the main cylinder to carry out a tilting movement (in the figure, in clockwise direction) whereby the plow frame 1 is displaced forwards relative to the tractor, the reduced resistance in the ground being compensated for partly by an instantaneous increase in speed of the remaining plow bodies and partly by an increase in the moment seeking to force the plow frame towards the ground (FIG. 2) i.e., causes the forward end of the plow frame 1 to be elevated and pivoted about the guide 25 and loop 26 to thereby lower the rearward end of that frame. The inclination of plow frame 1 is in normal practical operation, of course, not as pronounced as shown in FIG. 2, because the movement is to a large extent balanced by the resistance from the ground and from supporting wheels which may be arranged. For reasons of clearness, the tractor supports shown in FIGS. 1 and 2 are assumed fixed.

The device described and illustrated refers to the folding upwards of one plow body. In the event, however, that two plow bodies at the same time strike against an obstacle in the ground, and thus are released, the plow frame will in principle be displaced forwards in relation to the tractor a distance twice as long as in the case of the release of only one plow body. The remaining components, as they were described for the release of one plow body, are shifted about proportionally so that the tractor will be loaded uniformly even under these conditions. If three or more plow bodies, at the same time, should strike against obstacles in the ground, the effect obtained will not be as favourable as in the aforementioned cases, because the balancing cannot reasonably be expected to be dimensioned for such an improbable event.

It is, however, theoretically possible, if required, to dimension the device according to the invention even such, that all plow bodies, with the exception of one, can be folded upwards at the same time for avoiding obstacles in the ground.

The device according to the invention has proved to render smooth and advantageous operation when applied to plows with three or more plow bodies, the releasing pressure in the hydraulic system being easily variable (by connection with the hydraulic system of the tractor) for different types of soil. The device may, of course, be employed even in trailer plows, but its effect is, as stated, particularly favourable in connection with plows of the suspension type.

What I claim is:

1. Improvements in plows, particularly suspension plows of the type having a plow frame with at least three upwardly folding plow beams mounted thereon and a plow body mounted on each plow beam the plow frame being adapted to be coupled with a pair of pulling arms fixed to a tractor including means for causing a plow body to be folded upwardly when it strikes an obstacle in the ground in order to prevent overload and at the same time causing the plow beam to act upon the pulling arms of the tractor to displace the plow frame forward in relation to the pulling arms and to the pulling tractor; comprising, in combination, a hydraulic ram for each plow body and associated plow beam operated by the plow beam as it pivots about its mounting, a transverse shaft mounted on the plow frame, a pair of arms one fixed to said shaft adjacent each end thereof, a pair of pulling arms each fixed to the tractor and pivotally connected one to each said shaft arm, a center arm fixed on said shaft for rotation therewith, a main hydraulic cylinder secured to the plow frame, said cylinder having a piston and piston rod, said piston rod being pivotally connected to said shaft center arm, said main hydraulic cylinder being hydraulically connected to said hydraulic rams whereby the folding of a plow body upwardly causes said shaft to rotate in a direction to move the plow frame forwardly relative to the pulling tractor.

2. A device according to claim 1 characterized in that means are provided for urging the other plow bodies downwardly when a particular plow body strikes an obstacle, said means comprising a relatively stable bridge connected to the tractor pulling arms and to the tractor pressure rod, said plow frame being pivotally mounted relative to said bridge, said pivotal mounting being rearwardly of said transverse shaft whereby operation of said piston of said main hydraulic cylinder and resultant rotation thereof cause an upward movement of the forward end of said plow frame and a consequent downward movement of the rearward end thereof thereby urging said other plow bodies downwardly.

References Cited by the Examiner

UNITED STATES PATENTS

| | | | |
|---|---|---|---|
| 1,285,900 | 11/18 | Bartholomew | 172—269 |
| 1,331,044 | 2/20 | Bartholomew | 172—294 |
| 2,298,539 | 10/42 | Mott | 172—265 |
| 3,042,122 | 7/62 | Anderson | 172—265 |

FOREIGN PATENTS

| | | |
|---|---|---|
| 72,624 | 5/51 | Denmark. |
| 1,226,606 | 2/60 | France. |
| 161,298 | 11/57 | Sweden. |

T. GRAHAM CRAVER, *Primary Examiner.*

A. JOSEPH GOLDBERG, *Examiner.*